Patented Dec. 20, 1938

2,140,987

UNITED STATES PATENT OFFICE 2,140,987

AZO COMPOUNDS AND PROCESS FOR COLORING THEREWITH

Joseph B. Dickey, Rochester, N. Y., assignor to Eastman Kodak Company, Rochester, N. Y., a corporation of New Jersey No Drawing. Application May 7, 1938,
Serial No. 206,660

17 Claims. (Cl. 8—50)

This invention relates to new aromatic azo compounds and their application to the art of dyeing or coloring. More particularly, the invention relates to aromatic azo compounds which may be prepared by coupling a diazotized aromatic amine with a 4,6-diketopyrimidine having a member selected from the group consisting of an alkyl group, an aralkyl group, an aryl group and a furan nucleus attached through oxygen or sulfur to the 2 position of the 4,6-diketopyrimidine nucleus and the application of the nuclear non-sulfonated azo dye compounds of the invention to the coloration of organic derivatives of cellulose.

Organic derivatives of cellulose are characterized by an indifferent affinity for the usual cotton and wool dyes, especially the ordinary water soluble dyes. Because of this, it has been necessary to develop new dye compounds suitable for the dyeing or coloration of materials, such as textile materials, made of or containing an organic derivative of cellulose. It is, accordingly, an object of my invention to provide a new class of azo dyes suitable for the dyeing or coloration of organic derivatives of cellulose. Another object is to provide a process for the dyeing or coloration of organic derivatives of cellulose. A further object is to provide a process for the coloration of organic derivatives of cellulose in which the dye or dyes are applied directly to the material undergoing coloration from an aqueous suspension. A still further object is to produce dyeings on organic derivatives of cellulose which are of good fastness to light and washing.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose, or benzyl cellulose.

The azo compounds of my invention have the probable general formula:

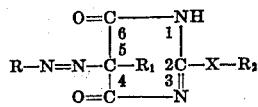

wherein R represents the residue of an aromatic diazo component, $R_1$ represents a member selected from the group consisting of hydrogen and an alkyl group, X represents a member selected from the group consisting of oxygen and sulfur and $R_2$ represents a member selected from the group consisting of an alkyl group, an aralkyl group, an aryl group and a furan nucleus. Advantageously, R is an aryl nucleus of the benzene series.

The term alkyl, as used above, includes not only the radicals of hydrocarbons having the general formula $C_nH_{2n+1}$, wherein $n$ is a positive whole integer, such as methyl, ethyl, a propyl, or a butyl radical, but also, substituted alkyl radicals, such as, for example, alkyl radicals substituted by OH— groups, such as hydroxyethyl, β-hydroxypropyl, γ-hydroxypropyl, a hydroxybutyl or a dihydroxypropylene radical, such as β-γ-hydroxypropyl, for example, alkyl radicals substituted by halogen, such as, for example, chloro-, bromo-, or iodo-ethyl radicals, further the ethers and esters thereof, such as methoxyethyl- or acetoxyethyl- or ethylsulfuric acid radicals.

The nuclear non-sulfonated aromatic azo compounds of the invention constitute valuable dyes for the coloration of organic derivatives of cellulose yielding shades ranging from greenish-yellow to red of good fastness to light and washing. These compounds similarly possess application for the coloration of wool and silk. The nuclear sulfonated azo compounds possess little or no utility for the coloration of organic derivatives of cellulose but may be employed to color silk and wool.

As previously indicated, the azo compounds of my invention can be prepared by coupling a diazotized aromatic amine with a 4,6-diketopyrimidine having the general formula:

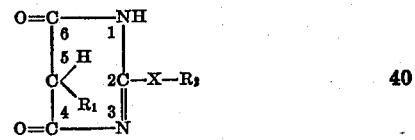

wherein $R_1$, X and $R_2$ have the meaning previously assigned them.

The aromatic amines employed in the preparation of the compounds of my invention may be substituted in the aromatic nucleus as will more fully appear hereinafter.

The following examples illustrate the preparation of the compounds of my invention. Unless otherwise indicated, quantities are expressed in parts by weight.

*Example 1*

12.3 grams of o-anisidine are dissolved in 150 cc. of water to which has been added 25 cc. of 36% hydrochloric acid. The resulting solution is cooled to a temperature approximating 0–5° C. by the addition of ice, for example, and diazotized by the addition of 6.9 parts of sodium nitrite.

14.2 grams of 2-methoxy-4,6-diketopyrimidine are dissolved in 200 cc. of water containing 30 grams of sodium carbonate. The resulting solution is cooled to a temperature approximating 0–10° C. by the addition of ice and the diazo solution prepared above is slowly added with stirring. Upon completion of the coupling reaction which takes place, the mixture is made acid to litmus by the addition of a mineral acid such as hydrochloric acid and the precipitated dye compound formed is recovered by filtration, washed with water and dried. The dye compound has the formula:

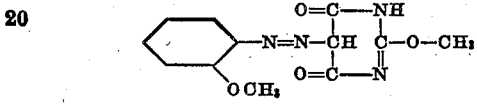

and colors cellulose acetate silk a greenish-yellow shade of good fastness from an aqueous suspension.

*Example 2*

13.7 grams of p-phenetidine are dissolved in 150 cc. of water to which has been added 25 cc. of 36% hydrochloric acid. The resulting solution is cooled to a temperature approximating 0–5° C. and the amine is diazotized while maintaining a temperature of 0–5° C. by the addition, with stirring, of a water solution of 6.9 grams of sodium nitrite.

15.6 grams of 2-ethoxy-4,6-diketopyrimidine are dissolved in 200 cc. of water containing 10 grams of sodium hydroxide. The resulting solution is cooled to a temperature approximating 0–10° C. by the addition of ice, for example, and the diazo solution formed above is slowly added with stirring. Upon completion of the coupling reaction, the mixture is made acid to litmus by the addition of hydrochloric acid following which the precipitated dye compound is recovered by filtration, washed with water and dried. The dye compound has the formula:

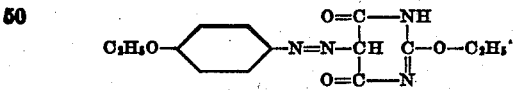

and colors cellulose acetate silk a greenish-yellow shade of good light fastness from an aqueous suspension.

*Example 3*

15.1 grams of o-propoxyaniline are added to 150 cc. of water to which has been added 25 cc. of 36% hydrochloric acid. The resulting solution is cooled to a temperature approximating 0–5° C. and diazotized, while maintaining this temperature, by adding, with stirring, a water solution of 6.9 grams of sodium nitrite.

20.6 grams of 2-β-methoxyethoxy-4,6-diketopyrimidine are dissolved in a dilute aqueous sodium carbonate solution. The resulting solution is cooled to a temperature approximating 0–10° C. and the diazo solution prepared as described above is slowly added with stirring. Upon completion of the coupling reaction which takes place, the mixture is made acid to litmus with hydrochloric acid following which the precipitated dye compound is recovered by filtration, washed with water and dried. The dye compound has the formula:

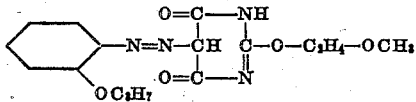

and colors cellulose acetate silk a greenish-yellow shade of good light fastness from an aqueous suspension.

*Example 4*

24.1 grams of 2,6-di-β-methoxyethoxyaniline are added to 150 cc. of water to which has been added 25 cc. of 36% hydrochloric acid and the resulting mixture is diazotized in the usual manner by the addition of a water solution of 6.9 grams of sodium nitrite.

17.2 grams of 2-β-hydroxyethoxy-4,6-diketopyrimidine are dissolved in 200 cc. of water containing 30 grams of sodium carbonate. The resulting solution is cooled to a temperature approximating 0–10° C. and the diazo solution formed above is slowly added with stirring. Upon completion of the coupling reaction which occurs, the mixture is made acid to litmus by the addition of hydrochloric acid and the precipitated dye compound is recovered by filtration, washed with water and dried. The dye compound has the formula:

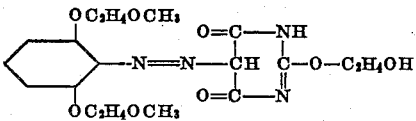

and colors cellulose acetate silk a greenish-yellow shade of good light fastness from an aqueous suspension.

*Example 5*

13.8 grams of o-nitroaniline are added to 100 cc. of water containing 40 cc. of 36% hydrochloric acid. The resulting solution is cooled to a temperature approximating 10–15° C. and diazotized at this temperature by the addition, with stirring, of a water solution of 6.9 grams of sodium nitrite.

15.8 grams of 2-methylthio-4,6-diketopyrimidine are dissolved in 200 cc. of water containing 30 grams of sodium carbonate. The resulting solution is cooled to a temperature approximating 0–10° C. and the diazo solution prepared as described above is slowly added with stirring. When the coupling reaction is complete, the mixture is made acid to litmus with hydrochloric acid and the precipitated dye compound formed is recovered by filtration, washed with water and dried. The dye compound formed has the formula:

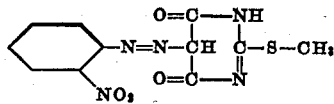

and colors cellulose acetate silk an orange-yellow shade of good light fastness from an aqueous suspension.

*Example 6*

17.3 grams of p-chloro-o-nitroaniline are diazotized in the usual manner and coupled with 14.2 grams of 2-methoxy-4,6-diketopyrimidine dissolved in 200 cc. of water containing 30 grams of sodium carbonate. Upon completion of the coupling reaction, the mixture is made acid to litmus by the addition of hydrochloric acid and the precipitated dye compound formed is recovered by filtration, washed with water and dried. The dye compound has the formula:

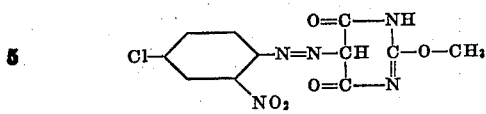

and colors cellulose acetate silk a greenish-yellow shade of good light fastness from an aqueous suspension.

*Example 7*

13.5 grams of p-aminoacetophenone are diazotized in the usual manner and coupled with 23.4 grams of 2-benzylthio-4,6-diketopyrimidine dissolved in 200 cc. of water containing 30 grams of sodium carbonate. Upon completion of the coupling reaction, the mixture is made acid to litmus by the addition of hydrochloric acid and the precipitated dye compound formed is recovered by filtration, washed with water and dried. The dye compound formed has the formula:

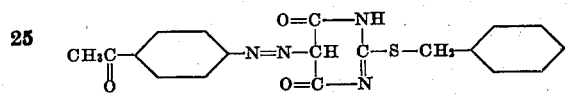

and colors cellulose acetate silk a yellow shade from a water suspension.

*Example 8*

18 grams of 6-methoxy-2-aminobenzothiazole are dissolved in a warm mixture of 60 grams of water, 25 grams of formic acid and 110 grams of sulfuric acid. The resulting solution is then cooled to a temperature of $-5°$ C. and diazotized at this temperature by the addition with stirring of a water solution of 6.9 grams of sodium nitrite. 22.6 grams of 2-tetrahydrofurfuryloxy-5-methyl-4,6-diketopyrimidine are dissolved in a dilute aqueous solution of sodium hydroxide and coupled with the diazo solution prepared above as described in Example 2. The dye compound formed is recovered from the reaction mixture and has the formula:

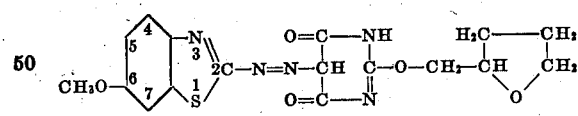

and colors cellulose acetate silk a yellow shade from a water suspension.

*Example 9*

16 grams of 1-amino-8-naphthol-2,4-disulfonic acid are dissolved in water containing 11 grams of sodium carbonate. The resulting solution is cooled to a temperature approximating 0–5° C. by the addition of ice, for example, and diazotized in the usual manner by the addition of a water solution of 7 grams of sodium nitrite. The solution resulting is then added dropwise to an iced solution of 50 grams of hydrochloric acid and 50 grams of water.

35.2 grams of 2-cetoxy-4,6-diketopyrimidine are dissolved in a dilute aqueous sodium hydroxide solution and the diazo solution formed above is slowly added with stirring. Upon completion of the coupling reaction which takes place, the mixture is made acid with a mineral acid and the dye compound formed is recovered by filtration, washed with water and dried. The dye compound has the formula:

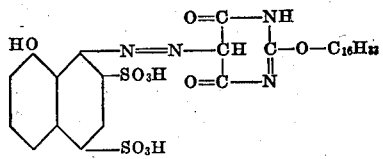

and colors silk and wool a yellow shade from an aqueous solution of the dye which may contain salt.

*Example 10*

5.4 grams of 2-amino-5-nitrobenzene sulfonic acid and 1.4 grams of sodium carbonate in 50 cc. of water are added to 19 cc. of 10% hydrochloric acid in ice water. The water solution of 1.8 grams of sodium nitrite is then added, with stirring, to effect diazotization.

36.8 grams of 2-cetoxy thio-4,6-diketopyrimidine are dissolved in 200 cc. of water containing 30 grams of sodium carbonate. The resulting mixture is cooled to a temperature approximating 0–10° C. and the diazo solution formed above is slowly added with stirring. Upon completion of the coupling reaction which takes place, the precipitated dye compound formed is recovered by filtration, washed with water and dried. The dye compound has the formula:

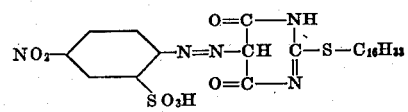

and colors silk and wool an orange-yellow shade from a water solution of the dye.

*Example 11*

25 grams of di-anisidine are dissolved in a minimum amount of hot concentrated aqueous hydrochloric acid and then poured onto ice. The resulting mixture is maintained in a cooled condition and the amine is diazotized in the usual manner by the addition of a water solution of 13.8 grams of sodium nitrite.

40 grams of 2-glyceryloxy-4,6-diketopyrimidine are dissolved in cold dilute hydrochloric acid and the diazo solution formed above is slowly added, with stirring. Upon completion of the coupling reaction which takes place, the precipitated dye compound formed is recovered by filtration, washed with water and dried. The dye compound has the formula:

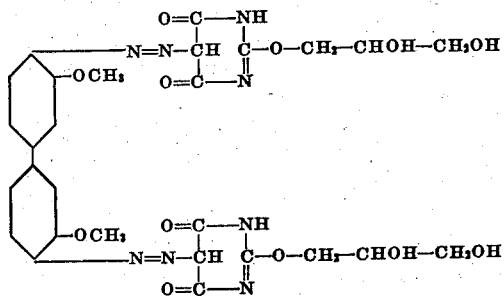

and colors cellulose acetate silk a greenish yellow shade of good fastness to light from an aqueous suspension.

Example 12

27.2 grams of

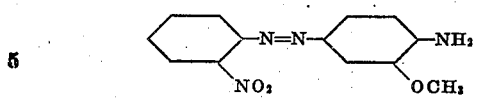

are added to 200 cc. of water to which has been added 40 cc. of 36% hydrochloric acid. The resulting solution is cooled to 20° C. by the addition of ice and diazotized at this temperature by adding, with stirring, a water solution of 6.9 grams of sodium nitrite.

21.5 grams of 2-β-hydroxy-β'-ethoxy-β-ethoxy ethyl ether (—O—C₂H₄—O—C₂H₄—O—C₂H₄OH)-4,6-diketopyrimidine are dissolved in 200 cc. of water containing 30 grams of sodium carbonate. The resulting solution is cooled to a temperature approximately 0–10° C. and the diazo solution prepared as described above is slowly added, with stirring. Upon completion of the coupling reaction which takes place, the mixture is made acid to litmus by the addition of hydrochloric acid and the precipitated dye compound formed is recovered by filtration, washed with water and dried. The dye compound has the formula:

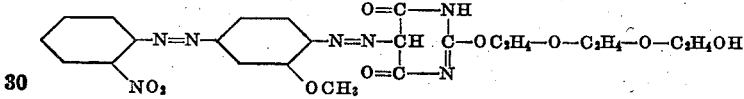

and colors cellulose acetate silk an orange-yellow shade from an aqueous suspension.

Example 13

1 gram mole of

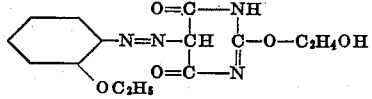

is dissolved in dry pyridine and treated at room temperature with one gram mole of chlorosulfonic acid. After standing at room temperature for several hours, the reaction mixture is heated to 60–70° C. likewise for several hours following which it is cooled and made neutral by the addition of an aqueous solution of sodium carbonate. The pyridine and water in the reaction mixture are then removed by distillation under reduced pressure and the residue remaining is washed in warm distilled water and filtered. The desired dye compound may be precipitated by the addition of sodium chloride following which it may be recovered by filtration, washed with water and dried. The dye compound has the formula:

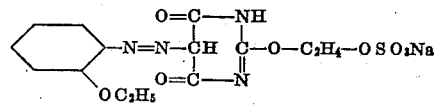

and colors cellulose acetate silk, wool and silk a greenish yellow color from an aqueous solution of the dye which may contain salt.

The above examples illustrating suitable methods of preparing a number of compounds of my invention are not to be considered as limiting it to the specific conditions shown as various modifications within the scope of the invention can be made. The following tabulation further illustrates the compounds employed in the process of my invention together with the color they produce on cellulose acetate silk. The compounds indicated below may be prepared by diazotizing the amines listed under the heading "Amine" and coupling the diazo compounds formed with the compounds specified in the column entitled "Coupling component". The diazotization and coupling reactions may, for example, be carried out in accordance with the general procedure disclosed in the examples illustrating the preparation of the azo compounds of the invention.

| Amine | Coupling component | Color on cellulose acetate silk |
|---|---|---|
| Aniline | 1. 2-methoxy-4, 6-diketopyrimidine | Greenish-yellow. |
| Do | 2. 2-ethoxy-4, 6-diketopyrimidine | Do. |
| Do | 3. 2-n-propoxy-4, 6-diketopyrimidine | Do. |
| Do | 4. 2-β-methoxy-ethoxy-4, 6-diketopyrimidine | Do. |
| Do | 5. 2-β-ethoxy-ethoxy-4, 6-diketopyrimidine | Do. |
| Do | 6. 2-β-hydroxyethoxy-4, 6-diketo-pyrimidine | Do. |
| Do | 7. 2-glyceryloxy-4, 6-diketopyrimidine | Do. |
| Do | 8. 2-phenoxy-4, 6-diketopyrimidine | Do. |
| Do | 9. 2-benzyloxy-4, 6-diketopyrimidine | Do. |
| Do | 10. 2-furfuryloxy-4, 6-diketopyrimidine | Do. |
| Do | 11. 2-tetrahydrofurfuryloxy-4, 6-diketopyrimidine | Do. |
| Do | 12. 2-methoxy-5-methyl-4, 6-diketopyrimidine | Do. |
| Do | 13. 2-ethoxy-5-ethyl-4, 6-diketopyrimidine | Do. |
| Do | 14. 2-β-methoxy-ethoxy-5-methyl-4, 6-diketopyrimidine | Do. |
| Do | 15. 2-β-hydroxyethoxy-5-methyl-4, 6-diketopyrimidine | Do. |
| Do | 16. 2-glyceryloxy-5-methyl-4, 6-diketopyrimidine | Do. |
| Do | 17. 2-phenoxy-5-methyl-4, 6-diketopyrimidine | Do. |
| Do | 18. 2-benzyloxy-5-methyl-4, 6-diketopyrimidine | Do. |
| Do | 19. 2-tetrahydrofurfuryloxy-5-methyl-4, 6-diketopyrimidine. | Do. |
| Do | 20. 2-methyl thio-4, 6-diketopyrimidine | Do. |
| Do | 21. 2-ethyl thio-4, 6-diketopyrimidine | Do. |
| Do | 22. 2-n-butyl thio-4, 6-diketopyrimidine | Do. |
| Do | 23. 2-β-methoxyethyl thio-4, 6-diketopyrimidine | Do. |
| Do | 24. 2-β-hydroxyethyl thio-4, 6-diketopyrimidine | Do. |
| Do | 25. 2-glyceryl thio-4, 6-diketopyrimidine | Do. |
| Do | 26. 2-phenylthio-4, 6-diketopyrimidine | Do. |
| Do | 27. 2-benzyl thio-4, 6-diketopyrimidine | Do. |
| Do | 28. 2-tetrahydrofurfuryl thio-4, 6-diketopyrimidine | Do. |
| Do | 29. 2-methyl-thio-5-methyl-4, 6-diketopyrimidine | Do. |
| Do | 30. 2-methyl-thio-5-ethyl-4, 6-diketopyrimidine | Do. |
| Do | 31. 2-β-hydroxyethyl thio-5-methyl-4, 6-diketopyrimidine. | Do. |
| Do | 32. 2-β-methoxy ethyl thio-5-methyl-4, 6-diketopyrimidine. | Do. |
| Do | 33. 2-glyceryl thio-5-methyl-4, 6-diketopyrimidine | Do. |
| Do | 34. 2-phenyl thio-5-methyl-4, 6-diketopyrimidine | Do. |
| Do | 35. 2-benzyl thio-5-methyl-4, 6-diketopyrimidine | Do. |
| Do | 36. 2-tetrahydrofurfuryl thio-5-methyl-4, 6-diketopyrimidine. | Do. |
| o-Anisidine | 1–36 above | Do. |
| m-Anisidine | 1–36 above | Do. |

| Amine | Coupling component | Color on cellulose acetate silk |
|---|---|---|
| p-Anisidine | 1-36 above | Greenish-yellow. |
| o-Phenetidine | 1-36 above | Do. |
| m-Phenetidine | 1-36 above | Do. |
| p-Phenetidine | 1-36 above | Do. |
| o-Phenoxyaniline | 1-36 above | Do. |
| m-Phenoxyaniline | 1-36 above | Do. |
| p-Phenoxyaniline | 1-36 above | Do. |
| o-Toluidine | 1-36 above | Do. |
| m-Toluidine | 1-36 above | Do. |
| p-Toluidine | 1-36 above | Do. |
| o-(F, Cl, Br, I)-aniline | 1-36 above | Do. |
| m-(F, Cl, Br, I)-aniline | 1-36 above | Do. |
| p-(F, Cl, Br, I)-aniline | 1-36 above | Do. |
| o-β-Hydroxyethoxy-aniline | 1-36 above | Do. |
| m-β-Hydroxyethoxy-aniline | 1-36 above | Do. |
| p-β-Hydroxyethoxy-aniline | 1-36 above | Do. |
| 1-amino-2,4-dimethoxybenzene | 1-36 above | Do. |
| 1-amino-2,5-dimethoxybenzene | 1-36 above | Do. |
| 1-amino-2,6-dimethoxybenzene | 1-36 above | Do. |
| 1-amino-2-methoxy-4-methylbenzene | 1-36 above | Do. |
| 1-amino-2-phenoxy-4-chlorobenzene | 1-36 above | Do. |
| 1-amino-2-phenoxy-4-methylbenzene | 1-36 above | Do. |
| 1-amino-2-methoxynaphthalene | 1-36 above | Do. |
| 1-amino-2-methoxy-5-chlorobenzene | 1-36 above | Do. |
| 1-amino-2-methoxy-5-methylbenzene | 1-36 above | Do. |
| 1-amino-2-phenoxy-5-chlorobenzene | 1-36 above | Do. |
| 1-amino-2-phenoxy-5-methylbenzene | 1-36 above | Do. |
| 1-amino-2-nitrobenzene | 1-36 above | Do. |
| 1-amino-2-nitro-4-chlorobenzene | 1-36 above | Do. |
| 1-amino-2-nitro-4-methylbenzene | 1-36 above | Do. |
| 1-amino-2-nitro-4-methoxybenzene | 1-36 above | Do. |
| 1-amino-2-nitro-5-chlorobenzene | 1-36 above | Do. |
| 1-amino-2-nitro-5-methylbenzene | 1-36 above | Do. |
| 1-amino-2-nitro-5-methoxybenzene | 1-36 above | Do. |
| 1-amino-2-nitro-4-acetobenzene | 1-36 above | Do. |
| Dianisidine | 1-36 above | Orange-yellow. |
| 1-amino-2,4-dinitrobenzene | 1-36 above | Yellow. |
| p-Aminoacetophenone | 1-36 above | Orange-yellow. |
| p-Aminoazobenzene | 1-36 above | Greenish-yellow. |
| 1-amino-3-hydroxybenzene | 1-36 above | Do. |
| 1-amino-4-hydroxy-benzene | 1-36 above | Do. |
| m-Aminoacetanilide | 1-36 above | Do. |
| p-Aminoacetanilide | 1-36 above | Do. |
| o-Aminobenzamide | 1-36 above | Do. |
| m-Aminobenzamide | 1-36 above | Do. |
| p-Aminobenzamide | 1-36 above | Red. |
| p-Amino dimethylaniline | 1-36 above | Greenish-yellow. |
| o-Amino benzene sulfonamide | 1-36 above | Do. |
| m-Amino benzene sulfonamide | 1-36 above | Do. |
| p-Amino benzene sulfonamide | 1-36 above | Do. |
| 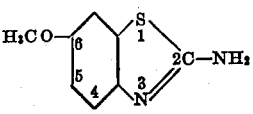 | 1-36 above | Do. |
| 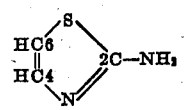 | 1-36 above | Do. |

| Amine | Coupling component | Color on wool and silk |
|---|---|---|
| 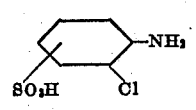 | 1-36 above | Greenish-yellow. |
| 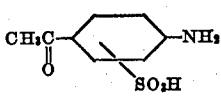 | 1-36 above | Do. |
| 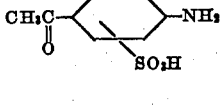 | 1-36 above | Do. |
| 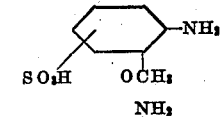 | 1-36 above | Do. |
| 1-amino-2-sulfonic-4-nitrobenzene | 1-36 above | Orange-yellow. |
| 1-amino-2-naphthol-4-sulfonic acid | 1-36 above | Do. |

In order that the preparation of the compounds of my invention may be clearly understood, the preparation of various intermediate compounds employed in their manufacture will be described.

4,6-diketopyrimidines having the general formula

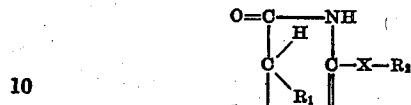

wherein $R_1$, $R_2$ and $X$ have the meaning previously assigned to them may be prepared by reacting compounds of the general formula:

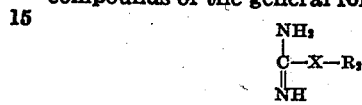

wherein $X$ represents oxygen or sulfur and $R_2$ represents an alkyl group, an aralkyl group, an aryl group or a furan nucleus with a suitable malonic acid ester such as methyl malonate. The preparation of the iso-urea compounds above mentioned will first be described following which the preparation of the 4,6-diketopyrimidine compounds will be described.

Preparation of alkyl iso-ureas

Methyl iso-urea, ethyl iso-urea and propyl iso-urea may be prepared as described in the article by S. Basterfield and Myron S. Whelen, pages 3177–3180, inclusive, of vol. 49 of the Journal of the American Chemical Society.

Preparation of substituted alkyl iso-ureas 200 grams of anhydrous glycerine are saturated in the cold with dry hydrogen chloride following which 20 grams of cyanamide are added and the reaction mixture stirred while maintaining it at room temperature. The cyanamide slowly dissolves and after several days glyceryl iso-urea may be recovered in the form of its hydrochloride by concentrating the reaction mixture under reduced pressure. The product obtained has the formula:

$$HOCH_2-CH-CH_2-O-C-NH_2 \cdot HCl$$
$$\phantom{HOCH_2-C}OH \phantom{H_2-O-}NH$$

Ethylene glycol, diethylene glycol and $\beta$-methoxyethyl alcohol, for example, may be substituted for glycerine in the above reaction to obtain the corresponding iso-urea compounds in the form of their hydrochlorides.

Preparation of aralkyl iso-ureas

Benzyl iso-urea and phenylethyl iso-urea may be prepared as described in the Canadian Journal of Research, vol. 1, pages 261–272, inclusive.

Preparation of tetrahydrofurfuryl iso-urea hydrochloride 200 grams of anhydrous tetrahydrofurfuryl alcohol are saturated in the cold with dry hydrogen chloride, following which 20 grams of cyanamide are added and the reaction mixture stirred while maintaining it at room temperature. The cyanamide slowly dissolves and after several days tetrahydrofurfuryl iso-urea is recovered in the form of its hydrochloride by concentrating the reaction mixture under reduced pressure. The product obtained has the formula:

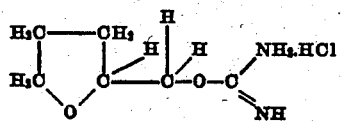

196 grams of anhydrous furfuryl alcohol may be substituted for the tetrahydrofurfuryl alcohol of the above example to obtain furfuryl iso-urea in the form of its hydrochloride.

Preparation of phenyl iso-ureas

Phenyl iso-urea may be prepared by reaction between phenol and cyanamide as described in Annalen, vol. 384, p. 342.

Phenyl iso-ureas in which the phenyl nucleus is substituted may be prepared in accordance with the method described for phenyl iso-urea by the use of suitably substituted phenols such as p-cresol or m-cresol, for example.

Preparation of alkyl iso-thioureas

Compounds of this type may be prepared by reaction between thiourea and an alkyl sulfate, such as methyl sulfate or ethyl sulfate for example.

Preparation of substituted alkyl iso-thioureas 76 grams of thiourea and 50 cc. of water are heated to 70° C. and 100 grams of $\beta$-hydroxyethylsulfate are added dropwise with stirring. When the reaction is complete, water is added and the compound formed is dissolved by heating to boiling following which the solution is filtered. Upon cooling, $\beta$-hydroxyethyl iso-thiourea crystallizes out in the form of its sulfate and may be recovered from the mixture by filtration. The product obtained has the formula:

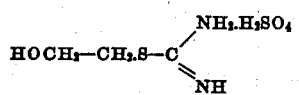

Glyceryl iso-thiourea sulfate may be prepared by reaction between thiourea and glyceryl sulfate in accordance with the method set forth in connection with $\beta$-hydroxyethyl iso-thiourea.

Preparation of p-tolyl iso-thiourea 40 grams of p-thiocresol and 20 grams of cyanamide are reacted in 150 cc. of ether. After reaction is complete, the ether is removed and the product formed is dissolved in a 30% aqueous solution of acetic acid. The resulting solution is then filtered and the p-tolyl iso-thiourea formed is precipitated by the addition of sodium carbonate. The precipitated compound may be recovered by filtration and has the formula:

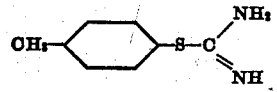

The preparation of p-tolyl iso-thiourea is described in Annalen, vol. 384, pages 324–5. The preparation of other aryl iso-thioureas is described in volume 384 of Annalen. The preparation of phenyl iso-thiourea is described on page 323, that of phenyl tolyl iso-thiourea on page 346 and that of phenyl methyl tolyl iso-thiourea on page 348.

Preparation of benzyl iso-thiourea sulfate 76 grams of thiourea and 60 cc. of water are heated to 70° C. and 130 grams of benzyl sulfate are added dropwise with vigorous stirring. Upon completion of the reaction, water is added and the product formed is dissolved by heating the reaction mixture to boiling. The reaction mixture is then filtered and upon cooling benzyl iso-thiourea crystallizes out in the form of its sulfate and can be recovered from the filtrate by filtration. The product obtained has the formula:

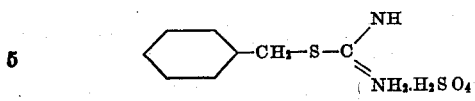

Preparation of tetrahydrofurfuryl iso-thiourea sulfate

This compound may be prepared by reaction between thiourea and tetrahydrofurfuryl sulfate in accordance with the method described in connection with benzyl iso-thiourea and β-hydroxyethyl iso-thiourea.

As previously indicated, the 4,6-diketopyrimidine compounds employed in the preparation of the azo compounds of my invention may be prepared by condensing an iso-urea or iso-thiourea, such as those whose preparation has been specifically disclosed above, with a suitable ester of malonic acid. For the preparation of 4,6-diketopyrimidine unsubstituted in the 5-position, di-methyl malonate has been found to be desirable. For the preparation of 4,6-diketopyrimidines substituted with an alkyl group in the 5-position, an alkyl di-methyl malonate may be employed as shown hereafter. 4,6-diketopyrimidines substituted in the 5-position with a methyl group, for example, may be prepared by employing methyl-di-methyl malonate in the condensation.

Preparation of 2-alkoxy-4,6-diketopyrimidines 2-methoxy-4,6-diketopyrimidine, 2-n-propoxy-4,6-diketopyrimidine, 2-n-butoxy-4,6-diketopyrimidine, 2-iso-butoxy-4,6-diketopyrimidine and 2-iso-amoxy-4,6-diketopyrimidine may be prepared as described in pages 261–272 of vol. 1, of the Canadian Journal of Research.

The preparation of 4,6-diketopyrimidines substituted in the 5-position with an alkyl group will be illustrated with reference to the preparation of 2-methyl-5-methyl-4,6-diketopyrimidine.

Preparation of 2-methyl-5-methyl-4,6-diketopyrimidine 146 grams of methyl-di-methyl malonate are warmed on a steam bath with 74 grams of methyl iso-urea for 5–20 minutes. The reaction product formed may be crystallized from water or ethyl alcohol, for example, and has the formula:

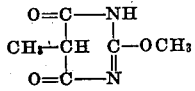

By the substitution of ethyl-di-methyl malonate for methyl-di-methyl malonate in the above reaction, 2-methyl-5-ethyl-4,6-diketopyrimidine may be prepared. Similarly, by the substitution of methyl iso-thiourea for methyl iso-urea in the above reaction, 5-methyl-2-methylthio-4,6-diketopyrimidine may be prepared.

Preparation of 4,6-diketopyrimidines having an aralkyl group attached through oxygen to the 2-position of the 4,6-diketopyrimidine nucleus By the substitution of benzyl iso-urea and phenyl ethyl-iso-urea for the alkyl iso-ureas employed in the preparation of the 2-alkoxy-4,6-diketopyrimidine compounds above mentioned, 4,6-diketopyrimidines having a benzyl radical and a phenyl ethyl radical respectively attached through oxygen to the 2-position of the 4,6-diketopyrimidine nucleus can be obtained.

Preparation of 4,6-diketopyrimidines having an aryl group attached through oxygen to the 2-position of the 4,6-diketopyrimidine nucleus Compounds of this character unsubstituted in the 5-position may be prepared by condensing an aryl iso-urea such as phenyl iso-urea with di-methyl malonate. Compounds of the above character substituted in the 5-position with an alkyl group may be prepared as previously indicated by condensing an aryl iso-urea such as phenyl iso-urea with an alkyl di-methyl malonate such as methyl-di-methyl malonate, for example.

Preparation of 4,6-diketopyrimidines having a furan radical attached through nitrogen to the 2-position of the 4,6-diketopyrimidine nucleus Compounds of the above character, wherein the 5-position of the 4,6-diketopyrimidine nucleus is unsubstituted, may be prepared by condensing a furan iso-urea such as furfuryl iso-urea or tetrahydrofurfuryl iso-urea, for example, with di-methyl malonate. Compounds of the above character having an alkyl group in the 5-position of the 4,6-diketopyrimidine nucleus can be prepared by condensing a furan iso-urea such as furfuryl iso-urea or tetrahydrofurfuryl iso-urea with an alkyl di-methyl malonate such as methyl-di-methyl malonate, for example.

The 4,6-diketopyrimidine compounds, unsubstituted in the 5-position, having an alkyl, an aralkyl, an aryl or a furan nucleus attached through sulfur to the 2-position of the 4,6-diketopyrimidine nucleus may be prepared by condensing an alkyl iso-thiourea, an aralkyl iso-thiourea, an aryl iso-thiourea or a furan iso-thiourea with dimethyl malonate. The corresponding compounds substituted in the 5-position with an alkyl group may be prepared by employing an alkyl dimethyl malonate in place of dimethyl malonate.

In order that the application of the compounds of my invention may be clearly understood, their application for the direct dyeing or coloration of materials made of or containing an organic derivative of cellulose and more particularly cellulose acetate silk is described hereinafter. Although the remarks are more particularly directed to the dyeing or coloring of the above mentioned materials those pertaining to temperature, the dispersing agents, and the amounts of dispersing agent and dye which may be employed, for example, are of general applicability where the dye is to be applied directly to the fiber from an aqueous suspension. The general methods by which the dye compounds may be applied to the coloration of wool and silk are well known in the art and need not be described here.

The aromatic azo compounds of the invention are for the most part insoluble or substantially insoluble in water and, accordingly, in employing them as dyes they will ordinarily be applied to the material in the form of an aqueous suspension which can be prepared by grinding the dye to a paste in the presence of a sulfonated oil, soap, or other suitable dispersing agent and dispersing the resulting paste in water. Dyeing operations can, with advantage, be conducted at a temperature of 80–85° C. but any suitable temperature may be used. In accordance with the usual dyeing practice, the material to be dyed will ordinarily be added to the aqueous dyebath at a temperature lower than that at which the main portion is to be effected, a temperature approximating 45–55° C., for example, following which the temperature of the dyebath will be raised to that selected for carrying out the dyeing operation. The temperature at which the dyeing is conducted will vary somewhat depending, for example, on the particular material or materials undergoing coloration.

The amount of dispersing agent employed may be varied over wide limits. Amounts approximating 10-200% by weight on the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Generally speaking, however, the use of a dispersing agent is desirable.

Advantageously, dyeing is carried out in a substantially neutral dyebath. Perhaps more accurately, it should be stated that dyeing should not be carried out in an alkaline dyebath, that is one having any substantial alkalinity, since the presence of free alkali appears to effect the dyeing adversely. Dyeing in an acid dyebath is not recommended because of the tendency of acids to effect the material undergoing dyeing adversely. Because of these considerations, when a dispersing agent is to be employed preferably it is neutral or substantially neutral.

It will be understood that the azo compounds of my invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

While it is preferred to effect the coloration of materials made of or containing an organic derivative of cellulose by applying the dye compound from an aqueous dyebath directly to the material to be colored, the azo compounds of my invention may be applied employing the methods applicable to the so-called ice colors. Briefly, in accordance with this method of dyeing, the amine is absorbed and diazotized on the fiber after which the dye is formed in situ by developing with a coupling component such as 2-methoxy-4,6-diketopyrimidine or 2-methylthio-4,6-diketopyrimidine, for example.

In case a water soluble dye, such as that shown in Example 13, is employed for the coloration of the organic derivative of cellulose, the use of a dispersing or solubilizing agent, of course, is unnecessary. Such dyes may be dissolved in water, for example, and the dyebath thus obtained can be employed to color the material desired to be dyed.

The following examples illustrate how dyeing may be carried out in accordance with my invention. Quantities are expressed in parts by weight.

*Example A*

2.5 parts of

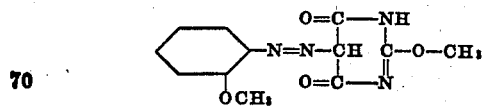

are finely ground with a dispersing agent such as soap or oleyl glyceryl sulfate and the resulting paste is dispersed in 1000 parts of water. The dispersion thus prepared is heated to a temperature approximating 45-55° C. and 100 parts of cellulose acetate silk in the form of yarn or fabric, for example, are added to the dyebath after which the temperature is gradually raised to 80-85° C. and the silk worked for several hours at this latter temperature. Sodium chloride may be added if desired during the dyeing operation to promote exhaustion of the dyebath. Upon completion of the dyeing operation, the cellulose acetate silk is removed, washed with soap, rinsed and dried. The cellulose acetate silk is colored a greenish yellow shade of good fastness to light.

*Example B*

By the substitution of 2.5 parts of

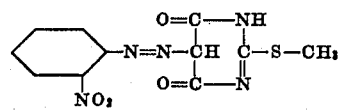

for the dye compound of Example A, cellulose acetate silk can be dyed an orange-yellow shade of good light fastness in an exactly similar manner as described in said example.

While my invention has been illustrated in connection with the dyeing of cellulose acetate silk, it will be understood that dyeing operations can be carried out in a manner similar to that described above by the substitution of another organic derivative of cellulose material for cellulose acetate or by employing dye compounds other than those employed in the example or by substitution of both the material being dyed and the dye compounds of the examples.

I claim:

1. An aromatic azo compound of a 4,6-diketopyrimidine having a member selected from the group consisting of an alkyl group, an aralkyl group, an aryl group and a furan nucleus attached through a member selected from the group consisting of oxygen and sulfur to the 2-position of the 4,6-diketopyrimidine nucleus.

2. The azo compounds having the general formula:

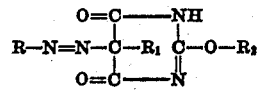

wherein R represents the residue of an aromatic diazo component, $R_1$ represents a member selected from the group consisting of hydrogen and an alkyl group and $R_2$ represents a member selected from the group consisting of an alkyl group, an aralkyl group, an aryl group and a furan nucleus.

3. The azo compounds having the general formula:

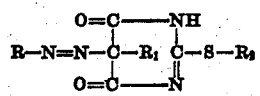

wherein R represents the residue of an aromatic diazo component, $R_1$ represents a member selected from the group consisting of hydrogen and an alkyl group and $R_2$ represents a member selected from the group consisting of an alkyl group, an aralkyl group, an aryl group and a furan nucleus.

4. The azo compounds having the general formula:

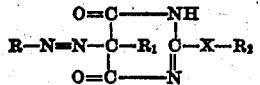

wherein R represents the residue of an aryl diazo component of the benzene series, $R_1$ represents a member selected from the group consisting of hydrogen and an alkyl group, X represents a member selected from the group consisting of oxygen and sulfur and $R_2$ represents a member selected from the group consisting of an alkyl group, an aralkyl group, an aryl group and a furan nucleus.

5. The azo compounds having the general formula:

$$O=C\text{---}NH$$
$$R\text{---}N=N\text{---}CH\quad C\text{---}X\text{---}R_2$$
$$O=C\text{---}N$$

wherein R represents the residue of an aromatic diazo component, X represents a member selected from the group consisting of oxygen and sulfur and $R_2$ represents a member selected from the group consisting of an alkyl group, an aralkyl group, an aryl group and a furan nucleus.

6. The azo compounds having the general formula:

$$O=C\text{---}NH$$
$$R\text{---}N=N\text{---}C\text{---}R_1\quad C\text{---}X\text{---}R_2$$
$$O=C\text{---}N$$

wherein R represents the residue of an aromatic diazo component, $R_1$ represents a member selected from the group consisting of oxygen and sulfur and $R_2$ represents an unsubstituted alkyl group.

7. The azo compounds having the general formula:

$$O=C\text{---}NH$$
$$R\text{---}N=N\text{---}CH\quad C\text{---}X\text{---}R_2$$
$$O=C\text{---}N$$

wherein R represents the residue of an aryl diazo component of the benzene series, X represents a member selected from the group consisting of oxygen and sulfur and $R_2$ represents an unsubstituted alkyl group.

8. The azo compounds having the general formula:

$$O=C\text{---}NH$$
$$R\text{---}N=N\text{---}CH\quad C\text{---}O\text{---}R_2$$
$$O=C\text{---}N$$

wherein R represents the residue of an aryl diazo component of the benzene series and $R_2$ represents an unsubstituted alkyl group.

9. The unsulfonated azo compounds having the general formula:

$$O=C\text{---}NH$$
$$R\text{---}N=N\text{---}C\text{---}R_1\quad C\text{---}X\text{---}R_2$$
$$O=C\text{---}N$$

wherein R represents the residue of an aromatic diazo component, $R_1$ represents a member selected from the group consisting of hydrogen and an alkyl group, X represents a member selected from the group consisting of oxygen and sulfur and $R_2$ represents a member selected from the group consisting of an alkyl group, an aralkyl group, an aryl group and a furan nucleus.

10. The process of coloring material made of or containing an organic derivative of cellulose which comprises applying thereto a nuclear non-sulfonated azo dye having the general formula:

$$O=C\text{---}NH$$
$$R\text{---}N=N\text{---}C\text{---}R_1\quad C\text{---}X\text{---}R_2$$
$$O=C\text{---}N$$

wherein R represents the residue of an aromatic diazo component, $R_1$ represents a member selected from the group consisting of hydrogen and an alkyl group X represents a member selected from the group consisting of oxygen and sulfur and $R_2$ represents a member selected from the group consisting of an alkyl group, an aralkyl group, an aryl group and a furan nucleus.

11. The process of coloring material made of or containing an organic derivative of cellulose which comprises applying thereto a nuclear non-sulfonated azo dye having the general formula:

$$O=C\text{---}NH$$
$$R\text{---}N=N\text{---}C\text{---}R_1\quad C\text{---}X\text{---}R_2$$
$$O=C\text{---}N$$

wherein R represents the residue of an aryl diazo component of the benzene series, $R_1$ represents a member selected from the group consisting of hydrogen and an alkyl group, X represents a member selected from the group consisting of oxygen and sulfur and $R_2$ represents a member selected from the group consisting of an alkyl group, an aralkyl group, an aryl group and a furan nucleus.

12. The process of coloring material made of or containing an organic derivative of cellulose which comprises applying thereto a nuclear non-sulfonated azo dye having the general formula:

$$O=C\text{---}NH$$
$$R\text{---}N=N\text{---}C\text{---}R_1\quad C\text{---}X\text{---}R_2$$
$$O=C\text{---}N$$

wherein R represents the residue of an aryl diazo component of the benzene series, $R_1$ represents a member selected from the group consisting of hydrogen and an alkyl group, X represents a member selected from the group consisting of oxygen and sulfur and $R_2$ represents an unsubstituted alkyl group.

13. The process of coloring material made of or containing an organic acid ester of cellulose which comprises applying thereto a nuclear non-sulfonated azo dye having the general formula:

$$O=C\text{---}NH$$
$$R\text{---}N=N\text{---}C\text{---}R_1\quad C\text{---}X\text{---}R_2$$
$$O=C\text{---}N$$

wherein R represents the residue of an aryl diazo component of the benzene series, $R_1$ represents a member selected from the group consisting of hydrogen and an alkyl group, X represents a member selected from the group consisting of oxygen and sulfur and $R_2$ represents a member selected from the group consisting of an alkyl group, an aralkyl group, an aryl group and a furan nucleus.

14. The process of coloring material made of or containing an organic acid ester of cellulose which comprises applying thereto a nuclear non-sulfonated azo dye having the general formula:

$$O=C\text{---}NH$$
$$R\text{---}N=N\text{---}C\text{---}R_1\quad C\text{---}X\text{---}R_2$$
$$O=C\text{---}N$$

wherein R represents the residue of an aryl diazo component of the benzene series, $R_1$ represents a member selected from the group consisting of hydrogen and an alkyl group, X represents a member selected from the group consisting of oxygen and sulfur and $R_2$ represents an unsubstituted alkyl group.

15. The process of coloring material made of or containing a cellulose acetate which comprises applying thereto a nuclear non-sulfonated azo dye having the general formula:

$$O=C\text{---}NH$$
$$R\text{---}N=N\text{---}C\text{---}R_1\quad C\text{---}X\text{---}R_2$$
$$O=C\text{---}N$$

wherein R represents the residue of an aromatic diazo component, $R_1$ represents a member selected from the group consisting of hydrogen and an alkyl group, X represents a member selected from the group consisting of oxygen and sulfur and $R_2$ represents a member selected from the group consisting of an alkyl group, an aralkyl group, an aryl group and a furan nucleus.

16. The process of coloring material made of or containing a cellulose acetate which comprises applying thereto a nuclear non-sulfonated azo dye having the general formula:

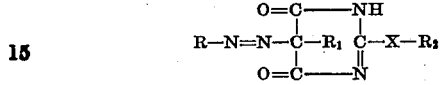

wherein R represents the residue of an aryl diazo component of the benzene series, $R_1$ represents a member selected from the group consisting of hydrogen and an alkyl group, X represents a member selected from the group consisting of oxygen and sulfur and $R_2$ represents a member selected from the group consisting of an alkyl group, an aralkyl group, an aryl group and a furan nucleus.

17. The process of coloring material made of or containing a cellulose acetate which comprises applying thereto a nuclear non-sulfonated azo dye having the general formula:

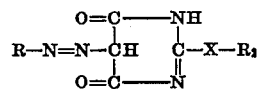

wherein R represents the residue of an aryl diazo component of the benzene series, X represents a member selected from the group consisting of oxygen and sulfur and $R_2$ represents an unsubstituted alkyl group.

JOSEPH B. DICKEY.